(12) United States Patent
Sobol et al.

(10) Patent No.: US 11,204,275 B2
(45) Date of Patent: Dec. 21, 2021

(54) NOISE SUPPRESSION IN SPECTROMETERS

(71) Applicant: Keit Limited, Didcot (GB)

(72) Inventors: James Paul Sobol, Wantage (GB); James David Powell, Oxford (GB); Jolyon Richard Tidmarsh, Didcot (GB); David James Edmonds Denny, Windsor (GB)

(73) Assignee: Keit Limited, Oxfordshire (GB)

( * ) Notice: Subject to any disclaimer, the term of this patent is extended or adjusted under 35 U.S.C. 154(b) by 63 days.

(21) Appl. No.: 16/626,172

(22) PCT Filed: Jun. 21, 2018

(86) PCT No.: PCT/GB2018/051726
§ 371 (c)(1),
(2) Date: Dec. 23, 2019

(87) PCT Pub. No.: WO2018/234804
PCT Pub. Date: Dec. 27, 2018

(65) Prior Publication Data
US 2020/0191650 A1 Jun. 18, 2020

(30) Foreign Application Priority Data
Jun. 23, 2017 (GB) .................... 1710100

(51) Int. Cl.
*G01B 9/02* (2006.01)
*G01J 3/02* (2006.01)
(Continued)

(52) U.S. Cl.
CPC ............ *G01J 3/0297* (2013.01); *G01J 3/18* (2013.01); *G01J 3/2803* (2013.01); *G01J 3/4531* (2013.01)

(58) Field of Classification Search
CPC .......... G01J 3/0297; G01J 3/18; G01J 3/2803; G01J 3/45; G01J 3/453; G01J 3/4531; G01J 3/26
See application file for complete search history.

(56) References Cited

U.S. PATENT DOCUMENTS 5,229,597 A 7/1993 Fukatsu
5,777,736 A * 7/1998 Horton .................... G01J 3/453
356/456

(Continued)

FOREIGN PATENT DOCUMENTS

WO WO 2011/086357 A1 7/2011
WO WO 2016/205565 A1 12/2016

OTHER PUBLICATIONS

E2V Technologies Limited, "Technical Note on the MTF of CCD Sensors," A1A-CCDTN105, issue 5, 5 pp. (Jun. 2003).
(Continued)

*Primary Examiner* — Tarifur R Chowdhury
*Assistant Examiner* — Jonathon Cook
(74) *Attorney, Agent, or Firm* — Leydig Voit & Mayer, Ltd.

(57) ABSTRACT

A spectrometer for detecting one or more wavelength components of sample radiation is disclosed. The spectrometer includes: a detector comprising a two-dimensional rectilinear array of pixels for generating signals representing an image based on collected sample radiation; one or more optical components arranged to form a spatial pattern based on spectral features of the sample radiation the spatial pattern including a plurality of aligned substantially parallel fringes oriented at a non-zero skew angle to the two-dimensional rectilinear array; and an analyser arranged to receive the signals and provide an output related to the one or more wavelengths. The spectrometer suppresses column/row noise in the detector. Also disclosed is a method of suppressing noise when signals are extracted and processed from detector arrays.

34 Claims, 12 Drawing Sheets

(51) Int. Cl.
*G01J 3/18* (2006.01)
*G01J 3/28* (2006.01)
*G01J 3/453* (2006.01)

(56) References Cited

U.S. PATENT DOCUMENTS

| | | | |
|---|---|---|---|
| 6,128,039 A | 10/2000 | Chen et al. | |
| 2012/0050746 A1 | 3/2012 | Sharma et al. | |
| 2012/0126148 A1* | 5/2012 | Borot | G02F 1/3555 250/504 R |
| 2012/0281223 A1* | 11/2012 | Mortimer | G01J 3/4531 356/456 |
| 2017/0059412 A1 | 3/2017 | Ye et al. | |

OTHER PUBLICATIONS

El Gamal et al., "Modeling and estimation of FPN components in CMOS image sensors," *Solid State Sensor Arrays: Development and Applications II*, vol. 3301. International Society for Optics and Photonics, 10 pp. (1998).

United Kingdom Intellectual Property Office, Search Report in United Kingdom Patent Application No. GB1710100.7, 1 p, (dated Dec. 22, 2017).

Cushing et al., "Spextool: a spectral extraction package for SpeX, a 0.8-5.5 micron cross-dispersed spectrograph," *Publications of the Astronomical Society of the Pacific*, 116(818): 362-376 (Apr. 2004).

De Nicola et al., "A two-dimensional fast Fourier transform method for measuring the inclination angle of parallel fringe patterns," *Optics & Laser Technology*, 30(3-4): 167-173 (Apr. 6, 1998).

Kadlecek et al., "Nondestructive spatial heterodyne imaging of cold atoms," *Optics Letters*, 26(3): 137-139 (Sep. 6, 2001).

Rayner et al., "SpeX: a medium-resolution 0.8-5.5 micron spectrograph and imager for the NASA infrared telescope facility," *Publications of the Astronomical Society of the Pacific*, 115(805): 362-382 (Mar. 2003).

European Patent Office, International Search Report in International Patent Application No. PCT/GB2018/051726, 6 pp, (dated Oct. 12, 2018).

European Patent Office, Written Opinion in International Patent Application No. PCT/GB2018/051726, 10 pp, (dated Oct. 12, 2018).

* cited by examiner

NOISE SUPPRESSION IN SPECTROMETERS

CROSS-REFERENCE TO RELATED APPLICATIONS

This application is a national phase application of International Patent Application No. PCT/GB2018/051726, filed Jun. 21, 2018, which claims priority to Great Britian Patent Application No, GB 1.710100,7, filed Jun. 23, 2017, both of which are incorporated by reference herein in their entireties for all purposes.

FIELD OF THE INVENTION

The present invention relates supressing column/row noise in detector arrays and is particularly suited to suppressing noise in detectors used in interferometer based spectrometers. The present invention also provides a method of suppressing noise when signals are extracted and processed from detector arrays.

BACKGROUND

A common design of Fourier transform interferometer is the Sagnac interferometer. Sagnac interferometers comprise a series of optical components which divide a beam into two parts and direct the two parts in opposite directions around a cyclic path. The path length in the two directions differ slightly such that when the two parts of the beams are recombined an interference pattern results. By taking a Fourier transform of the interference pattern spectral information on the beam is produced.

FIG. 1 shows a modified Sagnac interferometer comprising a beamsplitter 15, and a pair of mirrors 21, 22. The interferometer receives an input beam 10 of light or radiation such as infra-red radiation. The beamsplitter 15 divides the beam into two portions and directs the two portions to the mirrors 21 and 22. The beam portions travel along similar cyclic paths but in opposite directions. For example, the beam portion reflected at the beamsplitter 15 travels first to mirror 22, and then is reflected by mirror 22 towards mirror 21 where it is reflected by mirror 21 to direct the beam portion back towards the beamsplitter 15. On arrival at the beamsplitter the beam portion is reflected towards the detector 30. The portion of the input beam transmitted through the beamsplitter is transmitted to mirror 21 where it is reflected to mirror 22 and from mirror 22 back to beamsplitter 15. At beamsplitter 15 the beam portion is transmitted towards the detector. The Sagnac interferometer is sometimes known as a common path interferometer because the beam portions traverse very similar paths but in opposite directions. The two beam portions exit via the beamsplitter 15 and recombine at detector 30 to produce the interference pattern.

The Sagnac interferometer is tolerant to the positioning of the mirrors. This is because the path difference is produced as a result of the path of the beams being asymmetric and therefore vibrations or variations will affect both beams equally which will tend to cancel each other out at the interference fringes. In FIG. 1 the beam portions traverse similar triangular paths, but other shapes of path are possible. For example, by adding an extra mirror the path could be made square.

WO 2011/086357 A1 describes a Sagnac type interferometer such as that shown in FIG. 1. In this arrangement the mirrors 21 and 22 are curved mirrors. The curved mirrors provide focussing of the two beam portions on the detector 30. A spatial interferometric signal is formed at the detector. WO 2011/086357 A1 is hereby incorporated by reference herein.

The detector 30 may be a pixel array which may be optimised for detecting wavelengths of electromagnetic radiation of interest, such as visible light or infra-red. Example detectors may be CCD or CMOS arrays. The detector array may comprise a one or two dimensional array of pixels. A one dimensional array of pixels consists of a linear array or single line of pixels. A two dimensional array consists of detector with pixels arranged in rows and columns. For interferometer-based spectrometers, the interference pattern produced commonly has substantially all, if not almost all, of the variation in intensity in one direction only. In other words fringes are formed. The interference pattern will have a width across which the same pattern and intensity variations are spread out. Although it is possible to use a one-dimensional array detector and in some applications it may be possible to focus the interference pattern down such that its width is no more than that of a one-dimensional detector, in other applications it may be preferable to use a two-dimensional detector. In such a case it may be preferable not to focus the interference pattern or it may not be possible. For example, two-dimensional detector arrays may be available in a greater range of sizes and at lower cost than one-dimensional detector arrays. Hence, when using a two-dimensional detector the width of the interference pattern can be spread across the detector. This is shown schematically in FIG. 2 where the detector is a 7×13 pixel detector (i.e. has 7 rows of detector arranged in 13 columns) and the width of the interference pattern extends across 4-5 pixels in the vertical direction and variation in intensity (i.e. fringes) extends across 8-9 pixels in the horizontal direction. The use of a two dimensional detector array may allow more signal to be collected potentially enhancing the signal-to-noise ratio.

The use of a two-dimensional detector array results in an essentially one-dimensional signal being detected and recorded in two-dimensions. Detector arrays have inherent noise. For analogue two-dimensional detector arrays the inherent noise includes row and/or column noise, which is sometimes described as fixed pattern noise (FPN).

U.S. Pat. No. 6,128,039 (Chen et al.) relates to fixed pattern noise reduction and states that "readout circuits each generate pixel fixed pattern noise and the column amplifiers each generate column fixed pattern noise due to circuit and process variations". A paper by Gamal et al., "Modelling and Estimation of FPN Components in CMOS Image Sensors", SPIE 3301, Solid State Sensor Arrays: Development and Applications II, 1 Apr. 1998 has a description of the origin of column noise in CMOS sensors and compares FPN in CMOS and CCD detectors. Here it states "As depicted in FIGS. 1 and 2 the readout signal paths for both CMOS passive and active pixel sensors (PPS and APS) include several amplifiers some of which are shared by pixels and some are not. These amplifiers introduce additional FPN, which is not present in CCDs. In particular, the FPN due to variations in column amplifier offsets and gains causes 'striped' noise, which has a very different spatial structure than the white noise observed in CCDs." The paper also presents diagrams of typical CMOS/CCD readout architectures. Many circuit designs have been proposed to reduce the problem of fixed row/column noise in analogue detectors.

For detector arrays operating in the infra-red, detectors such as microbolometers may be used. For these and other detectors such as CCD and CMOS based detectors, as mentioned above, row and/or column noise may be present.

It is desirable to reduce or suppress the row and column noise to improve the signal-to-noise ratio and/or dynamic range of the detectors.

SUMMARY OF THE INVENTION

The present invention is directed to a method and apparatus for suppressing row and/or column noise from detectors having an array of pixels arranged in two dimensions. The method is especially suitable for suppressing the row and/or column noise when the information that is to be determined has a variation to be detected that extends in one direction only. For example, an interference pattern may have an intensity that increases and decreases a number of times, that is, the interference pattern may have bands of lighter and darker regions, known as fringes. The variation in intensity which produces the fringes may extend in one direction only. Although there may be some change in intensity in a second direction this may largely be due to reducing intensity towards the edges of the pattern and does not contribute to the overall spectral information that is desired to be collected. There may also be other types of pattern or data in which the desired information extends in one direction only across a two-dimensional detector array. Another example is the pattern or spectrum resulting from a diffraction grating.

Regarding the terms used in this disclosure we use the term "one-dimensional detector array" to mean a detector array that has a one dimensional array of pixels consisting of a linear array or single line of pixels. For the term "two-dimensional detector array" we mean a detector that consists of pixels arranged in rows and columns.

The present invention provides a spectrometer for detecting one or more wavelength components of sample radiation, the spectrometer comprising: a detector comprising a two-dimensional rectilinear array of pixels for generating signals representing an image based on collected sample radiation; one or more optical components arranged to form a spatial pattern based on, or resulting from, spectral features of the sample radiation, the spatial pattern comprising a plurality of aligned parallel or substantially parallel fringes oriented at a non-zero skew angle to the two-dimensional rectilinear array; and an analyser arranged to receive the signals and provide an output related to the one or more wavelengths. For example, the output may be an indication of wavenumbers of the sample radiation.

The spatial pattern is based on spectral features of the sample radiation. The spatial pattern and fringes will likely be a result of interference between different portions of sample light and may be described as an interference-based pattern. This may include an interference pattern resulting from an interferometer and a spectrum resulting from a diffraction grating. As such the spatial pattern may comprise parallel interference features.

A rectilinear array has pixels arranged in rows and columns.

Although the invention is described in relation to a rectilinear array of pixels, the invention is also applicable to other arrangements of pixels such as a hexagonal array of pixels or an array of pixels arranged similarly to a rectilinear array but without the right angle relationship between the rows and columns and may be known as a rhomboidal array based on a rhombus.

A spatial pattern is a pattern which is recorded spatially. That is, it does not require measurement at multiple times to be able to generate spectral data. An example of such a spatial pattern is a spatial interference pattern or interferogram. This is different to other interferograms which may be recorded temporally. A spectrum from a diffraction grating may also be considered to be a spatial pattern.

By the term "skew" we mean that the rectilinear array of pixels is rotated with respect to the fringes of the pattern such there is a non-zero angle between them. The rotation is an in-plane rotation such that the plane of the rectilinear array and the plane of the pattern are unchanged from the conventional arrangement, such as they remain coincident. The term skew indicates an angular offset or slant.

The fringes may extend across all or part of the detector array. In either case the signals used may be those from all of the pixels or a subset of pixels. For example, the subset may correspond to the pixels in region of the detector in which the fringes are incident, or the subset may be less than the region of the detector in which the fringes are incident (for example, if the signals in direction parallel to a fringe roll-off or reduce towards the extremities of the fringe). The pattern may be considered to have a length and a width. The length direction is a direction parallel to the direction of intensity variation. The width is transverse to the length direction, and is the direction in which the fringes or parts of the pattern have the same intensity. That is the fringes may be considered to extend in the width direction.

The analyser may be built in to the detector array or provided by another component. For example, the analyser may be built in to the same chip as the detector array.

The signals may be processed by the analyser at least along one or more straight lines parallel to, or transverse to, the fringes to generate an output representing one or more wavelength components based on the spatial pattern. The processing may comprise taking a spatial-to-frequency domain transform of the signals and processing the transformed image to extract the relevant frequency or wavelength information. Alternatively, averaging or integrating along lines parallel to the fringes may reduce the two-dimensional array of signals to a one-dimensional array which is then transformed from the spatial domain to the frequency domain.

The non-zero angle may be between 0.5 and 45°, but is preferably between 5 and 45°, or more preferably close to 45° such as between 40° and 50°. For broader ranges of frequencies the non-zero angle is preferably close to 45°. However, some noise suppression will be achieved for non-zero angular offset at which a line parallel to the fringe direction crosses from a first row or column of the rectilinear array to a different row or column. That is, the line crosses to a row or column that is adjacent to or spaced by one or more pixels from the first row or column.

The one or more optical components may be configured to form a static interferometer such as a modified Sagnac or Michelson interferometer. Preferably the static interferometer is a common path interferometer such as the Sagnac interferometer or a modified Sagnac interferometer. In a preferred example, the optical components are arranged to form a common path interferometer in which an input beam of the sample radiation is divided into first and second beam portions, these beam portion are directed in opposite directions around a cyclic path to form an interference pattern between the first and second portions at the detector surface. The cyclic path may be defined by at least two mirror regions curved in the plane of the cyclic path, such that the interference pattern represents path difference variations between the first and second beam portions across the detector surface in the plane of the cyclic path. The curved mirror regions may provide focussing of the beams as they traverse the cyclic path and approach the detector.

The detector may be adapted to detect infra-red radiation in the near infra-red, mid infra-red or a combination of both. The near infra-red ranges from 700 nm to 2.5 μm. The mid infra-red ranges from 2.5-20 μm. A preferred range is 2.6-15 μm. Alternatively, the detector may be adapted to detect radiation in the visible range, which depending on the type of detector used may extend from the UV to near infra-red such as from 200-1100 μm.

The analyser may be arranged to perform a spatial-to-frequency domain transform of the image, and determine the one or more wavelengths by sampling along a streak line in the transformed image. The spatial-to-frequency domain transform may be an inverse Fourier transform. A streak line may be a line of significantly different transformed signal value compared to surrounding signals in the transformed image such that when the transformed image is viewed by a user the streak line stands out to the user. This may be detected by the analyser by using a threshold level. The streak line may also be known as a signal line or transformed signal line.

The streak line in the transformed image may be at a non-zero angle, which may be equal to the non-zero skew angle. For clarity, the rectilinear array may be considered to have axes corresponding to column and row directions. The non-zero angle in the transformed image may be with respect to the transformed axes. For example, the non-zero angle in the transformed image may be with respect the zero y-frequency line.

The analyser may be arranged to integrate or average signals along the length of the aligned fringe, for example, to generate a 1-D set of data from the signals from the image from the 2-D array. The integrating or averaging of the signals from pixels may be along a line parallel to the fringe direction. The averaging or integrating may be taken along multiple such lines, each offset from the previous by at least approximately a pixel width.

The concept of fringes of an interference pattern is considered well known and relates to a varying intensity. The fringe direction is considered to be transverse to the direction in which the intensity varies. Similar considerations apply to a spectrum from diffraction grating.

The sample radiation is electro-magnetic radiation that may have illuminated a physical sample or may be generated from a sample emitter.

The detector may be an analogue detector, that is, a detector which provides an analogue output. For example, the detector may be a CCD or CMOS array. Alternatively, the detector may be a microbolometer array.

The detector is preferably planar, and is preferably arranged at the plane of an interference pattern.

The analyser may be configured to perform the following steps: receive data representing readout from pixels of the array; extract the data from diagonals of the array; calculate an average of the data for each of the diagonals; and generate a one dimensional array from the averages, the one dimensional array representing the spectral information as an interferogram. The non-zero angle may be 45° and the diagonals may be 45°.

In an alternative, more general arrangement, the fringes may be any non-zero angle and the analyser is configured to perform the following steps: generate a reference matrix having increasing values across the elements of the reference matrix at the non-zero skew angle; receive data representing readout from the pixels of the detector array; from the readout data extract data along lines at increasing values of the elements of the reference matrix; calculate an average of the data for each of the lines; and generate a one dimensional array from the averages, the one dimensional array representing the spectral information as an interferogram. The interferogram may comprise an equal number of elements as the reference matrix.

The reference matrix may be generated from first and second matrices, the first matrix X having increasing values in the row direction and the second matrix Y having increasing values in the column direction. The reference matrix R may have increasing values at a non-zero angle $\theta$ is generated from the first X and second Y matrices by the equation: $R = Y \sin\theta + X \cos\theta$.

In a further alternative arrangement the analyser may be configured to perform the following steps: receive image data representing readout from pixels of the array; take a two-dimensional Fourier transform of the image data; identify a line of the Fourier-transformed data representing an interference pattern and extract data along the line to produce spectral information. The step of identifying may comprise determining the maximum data value in the column of data. After receiving the image data the image data may be apodized.

The present invention also provides a method of detecting one or more wavelength components of sample radiation, the method comprising: generating a spatial pattern based on spectral features of the sample radiation, the spatial pattern comprising a plurality of parallel fringes; detecting, on a detector comprising a two-dimensional rectilinear array of pixels, an image of the spatial pattern, the plurality of parallel fringes aligned at a non-zero skew angle to the two-dimensional rectilinear array, and outputting signals representing the image; and receiving the signals at an analyser and the analyser providing an output related to the one or more wavelengths.

The method may further comprise processing the signals by the analyser at least along one or more straight lines parallel to, or transverse to, the fringes to generate an output representing one or more wavelength components based on the spatial pattern.

The non-zero angle may be between 0.5 and 45° or more preferably between 5 and 45°.

Further aspects of the spectrometer apparatus set out above may also be written as corresponding method steps.

The present invention also provides a spectrometer for detecting one or more wavelength components of sample radiation, the spectrometer comprising: a detector comprising a two-dimensional rectilinear array of pixels for generating signals representing an image based on collected sample radiation; one or more optical components arranged to form a spatial interference pattern comprising a plurality of aligned substantially parallel fringes oriented at a non-zero skew angle to the two-dimensional rectilinear array; and an analyser arranged to receive the signals and provide an output related to the one or more wavelengths.

In some embodiments the pattern on the detector may comprise a single line. Accordingly, the present invention also provides a spectrometer for detecting one or more wavelength components of sample radiation, the spectrometer comprising: a detector comprising a two-dimensional rectilinear array of pixels for generating signals representing an image based on collected sample radiation; one or more optical components arranged to form on the detector at least one spatial intensity feature based on spectral properties of the sample radiation, the spatial intensity feature comprising at least one straight line oriented at a non-zero skew angle to the two-dimensional rectilinear array; and an analyser arranged to receive the signals and provide an output related to the one or more wavelengths.

The present invention may also be applicable to other fields than spectroscopy where a two-dimensional image is generated by a pixel array and the desired output information actually comprises a one-dimensional data array. For example, the present invention may be applicable to holographic imaging and microscopy.

Accordingly the present invention provides a method of determining a one-dimensional pattern from an image recorded on a two-dimensional detector, the method comprising: detecting, on a detector comprising a two-dimensional rectilinear array of pixels, an image of the pattern, the pattern having a plurality of parallel linear features aligned at a non-zero skew angle to the two-dimensional rectilinear array, and outputting signals representing the image; and receiving the signals at an analyser and the analyser providing an output related to the pattern.

BRIEF DESCRIPTION OF THE DRAWINGS

Embodiments of the present invention and aspects of the prior art will now be described with reference to the accompanying drawings, of which:

FIG. 11 shows a higher spatial frequency column noise than FIG. 10;

DETAILED DESCRIPTION

Figure 3:
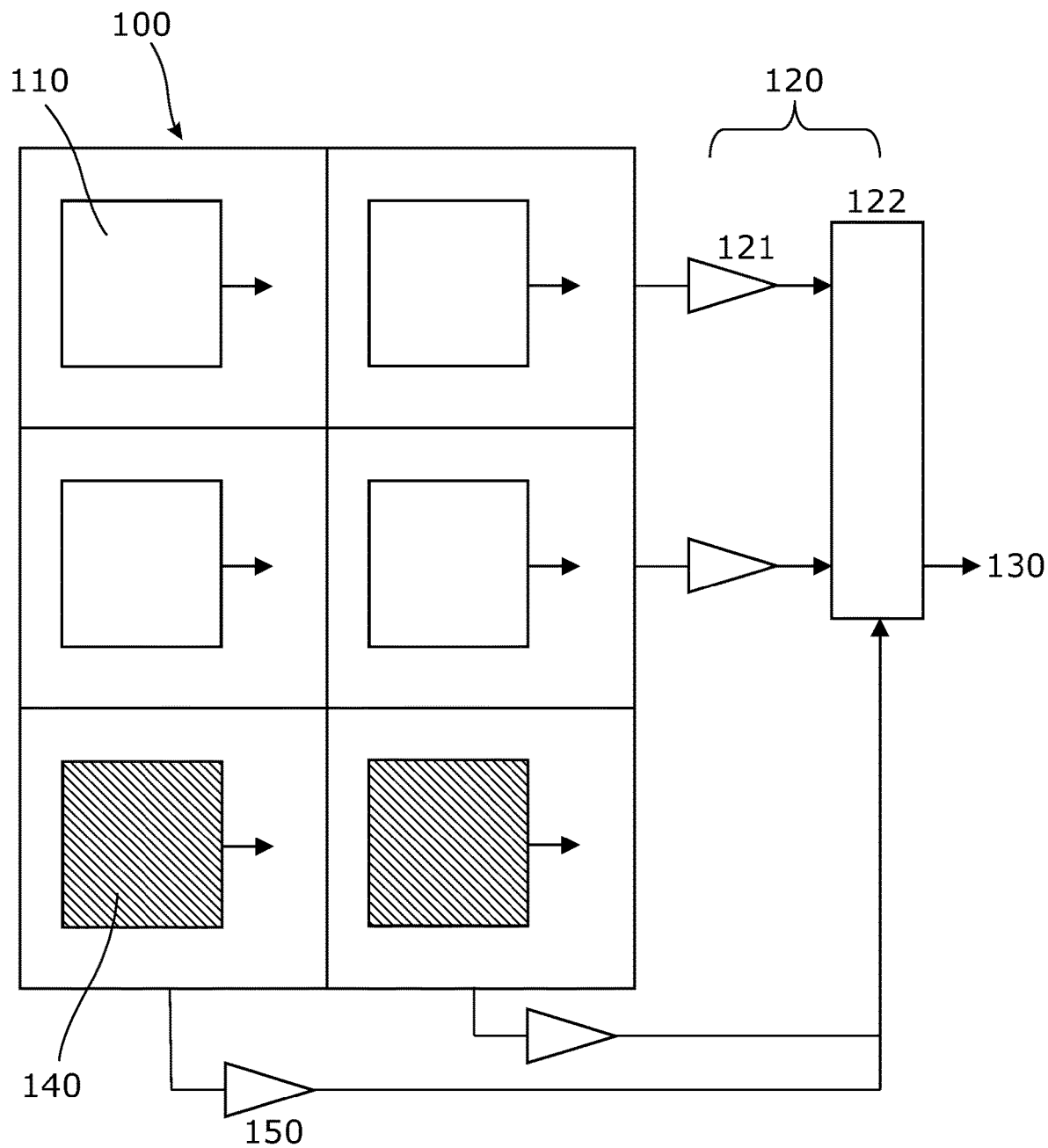
FIG. 3 is a schematic diagram of 2×2 pixel array including blind pixels and output circuitry.

FIG. 3 shows schematically the circuit of a detector array such as CMOS, CCD or microbolometer array. A detector array of 2×2 pixels 100 is shown. Each pixel 100 comprises a collection area 110 where light or radiation is collected. For CCD and CMOS detectors the radiation is converted into electrical charge which can be readout as a charge or voltage. For microbolometers the radiation heats an element and the resistance of that element changes with temperature, thereby producing a change in voltage across the element. In CMOS detectors and microbolometers the charge or voltage is readout a pixel at a time along a row and successively passed to output circuitry 120 which may include one or more amplifiers 121 and multiplexers 122 to combine readout from the rows. We now discuss the origins of row and column noise in these detectors:

1) Row Noise: As mentioned above, when reading out detector pixels they are read out a single row at a time. This may be through a signal chain that can include a separate bias/amplifier network for each row, followed by a multiplexer before the signal is fed to an output buffer to be sampled and output 130. This signal chain therefore has a row noise dependency related to the row's individual amplifier 121 and the multiplexer 122 that then passes the signal to the output amplifier therefore contributing only to row related noise.

2) Column noise: In microbolometers, although the pixels are read out a row at a time, each pixel as it is being read out is referred against a column blind bolometer 140. The blind bolometer is a substantially identical structure as the other bolometers in the array but is blocked from receiving radiation. The signal is passed through a column related bias/amplifier structure 150. These structures are individual to the detector columns and therefore they contribute only to column related noise.

Figure 4:
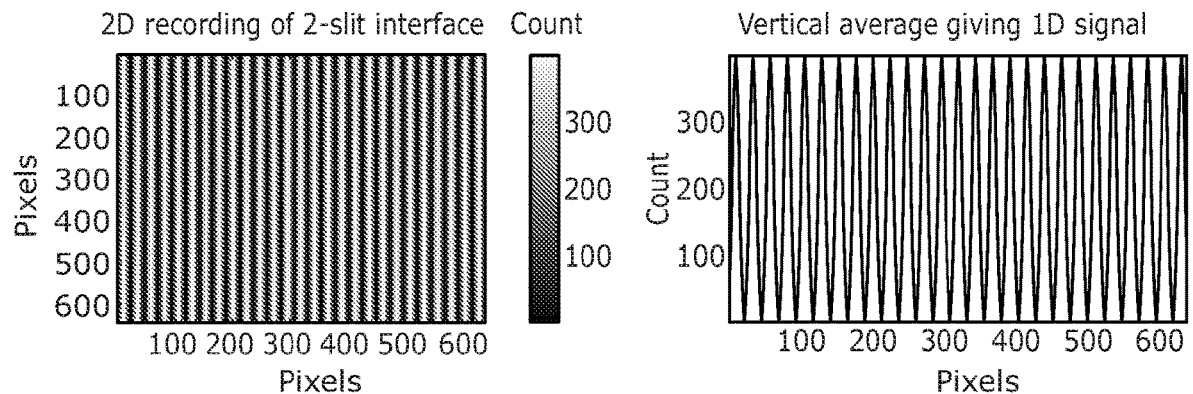
FIG. 4 shows the result of a simulation of an interference pattern on a 2D pixel array and 1D signal averaged from the 2D interference pattern.

FIG. 4 shows two images. The left hand image schematically shows an interference pattern on a 640×640 pixel array. In the example, the interference pattern is that resulting from two slits (Young's slits) and results in series of fringes of varying intensity across the detector. As shown in FIG. 4 the variation in intensity extends in the horizontal direction. In the vertical direction each fringe covers the full vertical extent of the detector. In the figure the lighter parts represent higher intensity and darker parts lower intensity The interference pattern is recorded by the detector to produce a two-dimensional image. To reduce the interference pattern to a one-dimensional set of data some processing of the two-dimensional image data is required. The processing can take many forms but is desirable to use all of the data such that information from all of the recorded radiation is used. In one preferred approach the data is averaged for each column such that data is reduced to a one-dimensional data set. In other words each column of the two-dimensional data set is reduced resulting in a one-dimensional interference pattern. An example of the one-dimensional interference pattern is plotted in the graph on the right hand side in FIG. 4. The vertical axis of the graph represents the averaged number of counts recorded on the pixel column and is proportional to the intensity of the collected radiation. The horizontal axis represents the position (in term of pixel number) of the column across the detector. If it is desired to produce a spectrum the one-dimensional data set is manipulated, such as by Fourier transform to convert the spatial interference pattern into a frequency or wavelength spectrum that may be output by the spectrometer.

Figure 5:
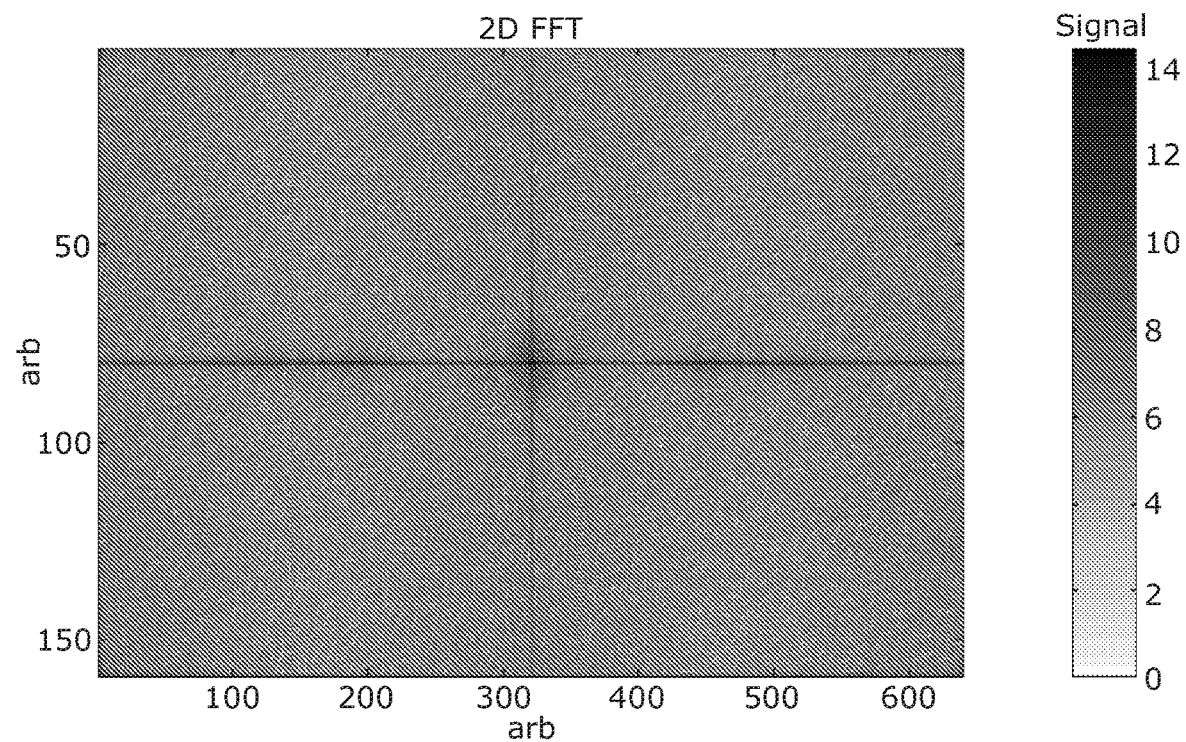
FIG. 5 is the result of a 2D Fourier transform of data from a microbolometer detector array when the fringes of the interference pattern are aligned along the column direction of the detector array.

FIG. 5 shows a 2D Fourier transform of data recorded on a 160×640 pixel microbolometer array. To emphasise features a natural logarithm of the Fourier transformed data is shown in the figure. Darker regions represent regions of higher intensity or signal. In the centre of the plot is a spot of high signal level that corresponds to low spatial frequency noise across the detector. There are also two medium signal level lines: one vertical and one horizontal, that cross in the centre of the 2D Fourier transform image. The vertical line corresponds to row noise at all spatial frequencies that are detectable by the detector. Similarly, the horizontal line corresponds to the column noise at all spatial frequencies recorded by the detector. With the arrangement of the interference pattern aligned as shown in the left hand figure of FIG. 4, that is with the maxima and minima bands of the fringes aligned vertically, the signal overlaps with the horizontal column noise line on the above image. This makes it very difficult to separate one from the other after recording and during processing. Thus, when the readout circuitry is column-wise a substantial proportion of the column noise is imprinted into the columns and processing of data from the whole array preserves the noise in the signal. For example, if the processing is to average the data down the column, the column noise is included in the final one-dimensional interferogram.

In the present invention the detector array is arranged rotated at an angle to the direction of the fringes of the interference pattern. This results in an angular offset or skew between the row and column directions and the direction of the fringes.

Figure 6:
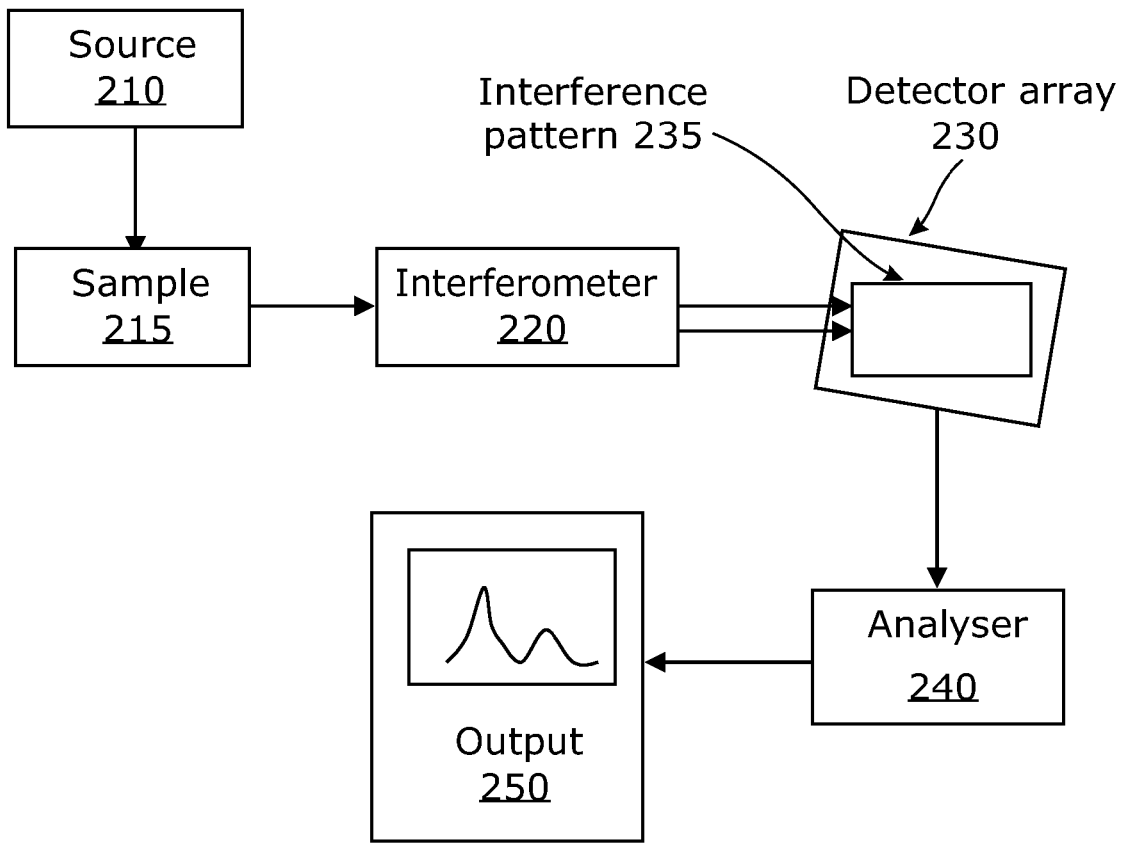
FIG. 6 is a block diagram of component of a spectrometer according to the present invention.
Figure 6:
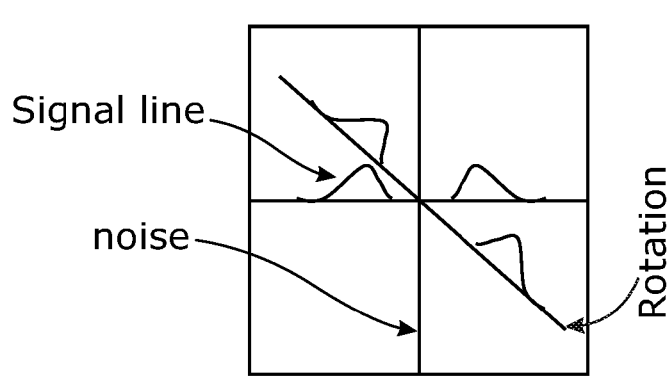

FIG. 6 is a block diagram showing an example embodiment of a spectrometer according to the present invention. The spectrometer comprises a light source 210 such as a laser or broadband light source which is directed at a sample 215. The sample may absorb light at particular wavelengths and this may be used as an indicator of a property or species of the sample. In other embodiments the source is omitted and the light or radiation to be collected is that directly produced by an emitter and it is the properties of the emitter itself that we are interested in. In either case the resulting radiation is sample radiation. The sample radiation is then directed at an interferometer 220. The interferometer may take many forms. For example, the interferometer may be a static interferometer such as a modified Sagnac or Michelson-based interferometer. The interferometer may be a common path interferometer such as that shown in FIG. 1 and disclosed in WO 2011/8086357 A1. The interferometer produces an interference pattern 235. The interference pattern 235 is formed at a two dimensional rectilinear detector array 230 such as a rectilinear array of pixels. The detector 230 is aligned such that the parallel or substantially parallel fringes of the interference pattern are aligned at a non-zero which we will call a skew angle to the two dimensional rectilinear array. The pixels of the detector array 230 collect the radiation or light and provide signals representative of the intensity of the collected radiation. The signals are received by an analyser 240 and processed to produce an output 250 related to the one or more wavelengths present or absent in the sample radiation. The output may be a graphical output as shown in the figure or may take other forms such as a numerical string or a series of indicator lights.

Interferometers are usually based on interfering two beams that have a phase relationship between them. The present invention is also applicable to diffraction grating based devices.

The analyser may be incorporated as functionality on the detector array, such as within the detector chip, or it may comprise circuitry in addition to the detector chip. In some embodiments the analyser may be a different device to the analyser. In a preferred arrangement the analyser may be part of the same device as the detector chip. The analyser may comprise a memory and a processor to perform processing functions. In some embodiments the analyser may be a computer. The processing performed by the analyser may employ a number of different techniques but these are likely to include at least one of averaging and taking a spatial-to-frequency domain transform. In one arrangement the signals from the detector array are first averaged or integrated along a line in a first direction such as corresponding the direction or width of the fringes, and secondly a transform is taken. Alternatively, signals from a whole or subset of the pixels of the array undergo a spatial-to-frequency domain transform, and after this selected data regions are used as an output, which may also include averaging or integrating. The transform in either of these methods may be an inverse Fourier transform.

Shown in FIG. 6 is also an example of the noise suppression or reduction seen by the method taking a spatial-to-frequency transform first. In the transform of all signals from the detector array row and column noise are seen as a horizontal and vertical lines forming a cross. In the conventional case with the fringes aligned parallel to a row or column direction the signal data falls at least partly coincident with the row and column noise structures. By rotating the detector such that there is a skew angle between the rows and columns of the detector array and the fringes the signal data is moved away from the row and column noise structure in the transformed image data, as indicated by the arrow. As can be seen at frequencies close to the origin, that is low frequencies, the noise remains close to the signal. Hence, it is more difficult to remove noise at lower frequencies. The signal lines in the transformed image may be seen as streaks or streak lines.

For an interferometer based device the data collected on the detector is an interferogram that requires a spatial-to-frequency transform (such as an inverse Fourier transform) to extract the frequency information. If instead, the device is based on a diffraction grating then the distance across the detector is approximately proportional to the wavelength. Hence, no transform is needed. Although this discussion is based on an interferometer based device, corresponding techniques are applicable to a diffraction grating based device. The latter is described in more detail towards the end of this disclosure.

In preferred embodiments the detector array may be a microbolometer array, that may be configured to operate in at least part of the mid infra-red range such as from 2.5-20 or more preferably 2.6-15 µm. Alternatively, if the desired frequency range is in the range 200-1100 µm a CCD or CMOS array may be used. Other detectors are also available and may be used, for example, InGaAs detectors, PbSe detectors, PbS detectors, HgCdTe detectors or pyroelectric two dimensional detector arrays. The detectors preferably provide output signals that vary in an analogue manner, such as an analogue variation in resistance or voltage.

Figure 7:
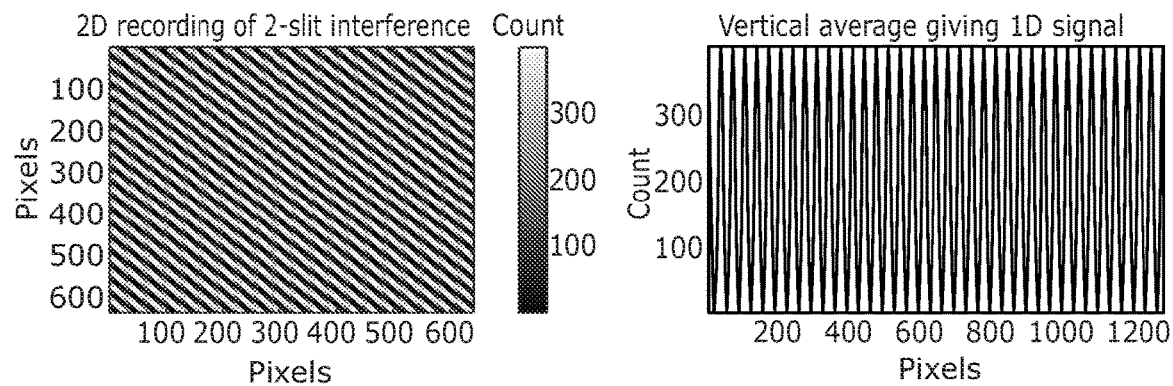
FIG. 7 shows the result of a simulation of an interference pattern on a 2D pixel array and 1D signal averaged from the 2D interference pattern, when the interference pattern is offset at 45° to the column direction of the detector array.

The interference pattern is recorded on the two dimensional detector array with the detector rotated or rolled. The roll or rotation may be around the centre of the active area. The roll or rotation may be by an angle with respect to the fringes of the interference pattern to produce a skew angle. That is, the plane of the detector is unchanged and substantially corresponds to the plane of the interference pattern, but the detector orientation is offset by a non-zero angle. The angle should be large enough to supress noise at the required frequency range. For example, this may require that the fringes are aligned along a diagonal of the detector. FIG. 7 relates to such an arrangement. The image on the left hand side of the figure shows the case where the fringes are recorded at a 45° angle with respect to the rectilinear array, i.e. the detector row and column directions.

To acquire a one dimensional interferogram, the two dimensional image as shown in FIG. 7 is averaged along the relevant diagonal to maximise the signal. This can result in the final one dimensional interferogram having more elements that the conventional vertical averaging case. The plot on the right-hand side of FIG. 7 has been obtained by simply averaging the image along the diagonal elements to obtain the one dimensional signal. It might be expected that the number of pixels would either stay the same or increase by a factor of $\sqrt{2}$ for a detector having an equal number of rows and columns and the diagonal at 45°. However, determining which pixels to use in the diagonal is not straight forward and the number of pixels approximately doubles in the method used in FIG. 7. Further discussion on how to decide the pixels to be used in the diagonal or other angular offset is provided later in the description.

The one dimensional interferogram signal can be derived in many ways from the interference pattern shown on the right hand side of FIG. 7. For example, a "row-by-row" transform such as a Fourier transform could be performed and the spectra summed in the Fourier domain. Various options for deriving the one dimensional interferogram are discussed later. However, the angled or diagonal processing results in column-wise spatial frequencies (noise) being averaged out when averaging along a diagonal or at an angle to the original two dimensional image. As a result the final one dimensional interferogram appears to suppress noise.

Figure 8:
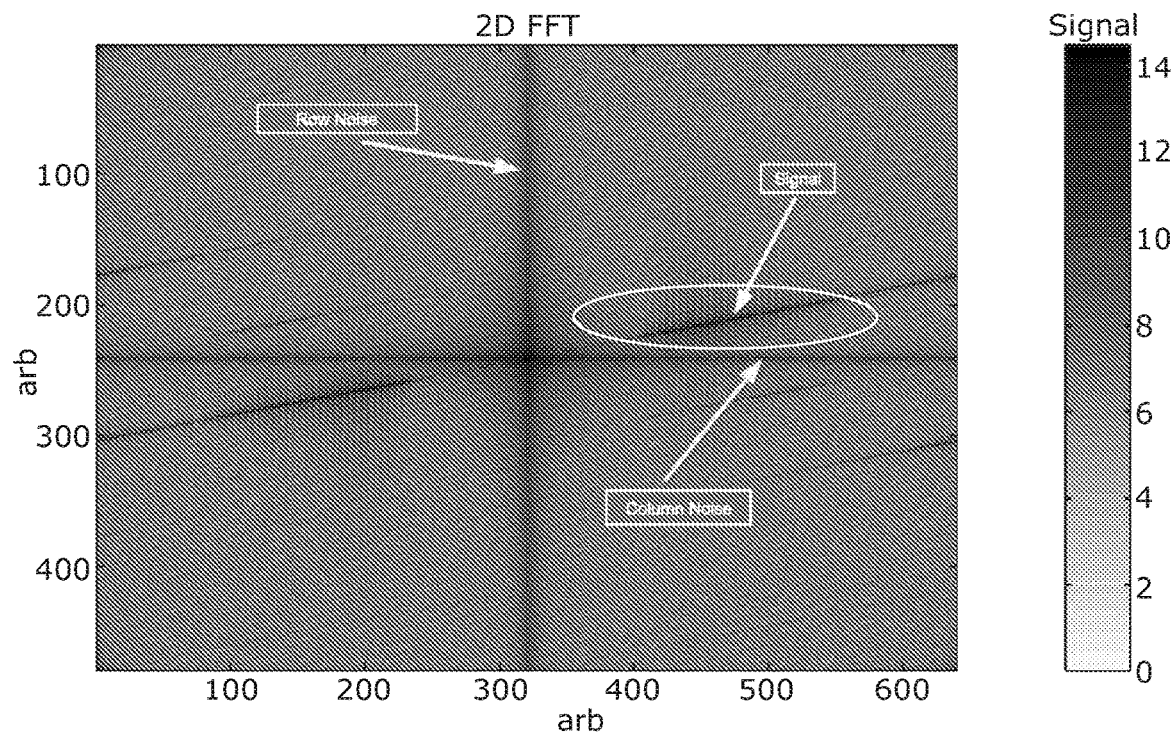
FIG. 8 is the result of a 2D Fourier transform of data from a microbolometer detector array when the fringes of the interference pattern are offset at 15° to the column direction of the detector array.

FIG. 8 shows a two dimensional Fourier transform plot similar to FIG. 5, again with the data emphasized by taking a natural logarithm. FIG. 8 differs in that the detector has been rotated by an angle of around 15 degrees with respect to fringes of the interference pattern. It can be seen that in the Fourier transformed domain the signal from the interference pattern no longer overlaps the column noise. Hence, it is in principle easier to separate the signal from the noise and again there are many ways to do this which are discussed below. The signal can be seen as streak lines which occur offset to the rectilinear array directions. The streak lines can be seen to occur in a region of the transformed space. In the example plot of FIG. 8, the streak lines comprise a series of lines forming a comb of frequencies. The comb is an artefact of the simulation here and can be eliminated by adding a zero offset before taking the Fourier transform.

Figure 9:
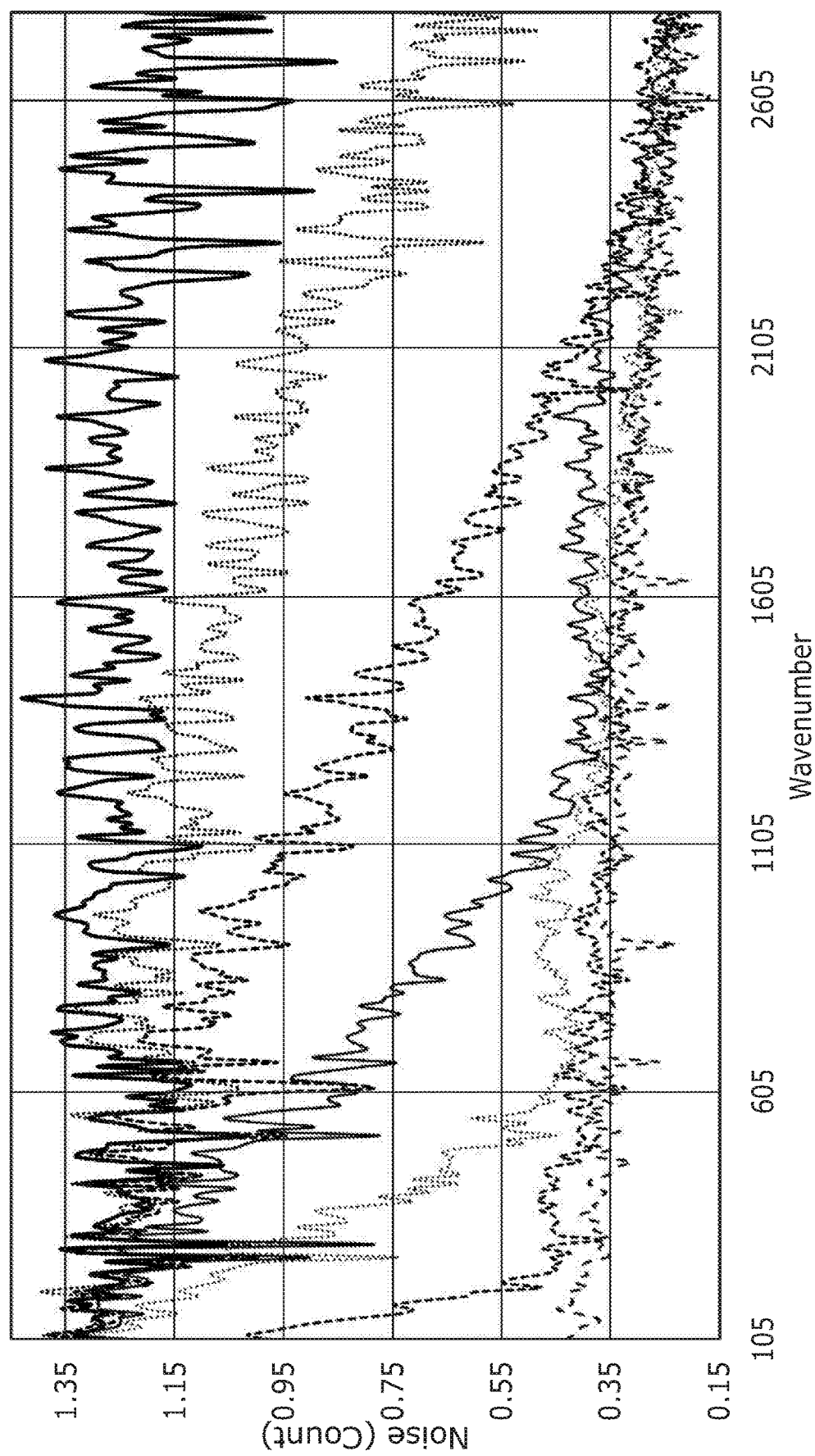
FIG. 9 is a graph showing decreasing spectral noise at high wavenumbers as the angle of offset between the averaging direction and column direction is increased.

FIG. 9 is graph showing the effect of averaging a two dimensional image along an angled or skew line, and for various angles of skew up to a 45 degree diagonal. The image was taken without an interference pattern incident on the detector such that the measurement is of noise only. Each line on the graph shows the spectral noise as a function of wavenumber (inverse wavelength) and has been averaged at a different rotation angle. The angle for each line is shown in degrees in the legend in the figure. The solid black line, which is the top trace in the graph, represents the conventional case of averaging the detector down columns. As the averaging angle is increased the noise at the right-hand side of the graph is supressed first. This side of the graph corresponds to the highest spatial frequencies (largest wavenumber) on the detector, so are supressed by tilted averaging at lower angles than noise on the left-hand side. The reasons for this are explained in the following paragraph. As the graph indicates, there is a significant reduction in the spectral noise by averaging along a diagonal such as at 45° rather than vertically.

Figure 10:
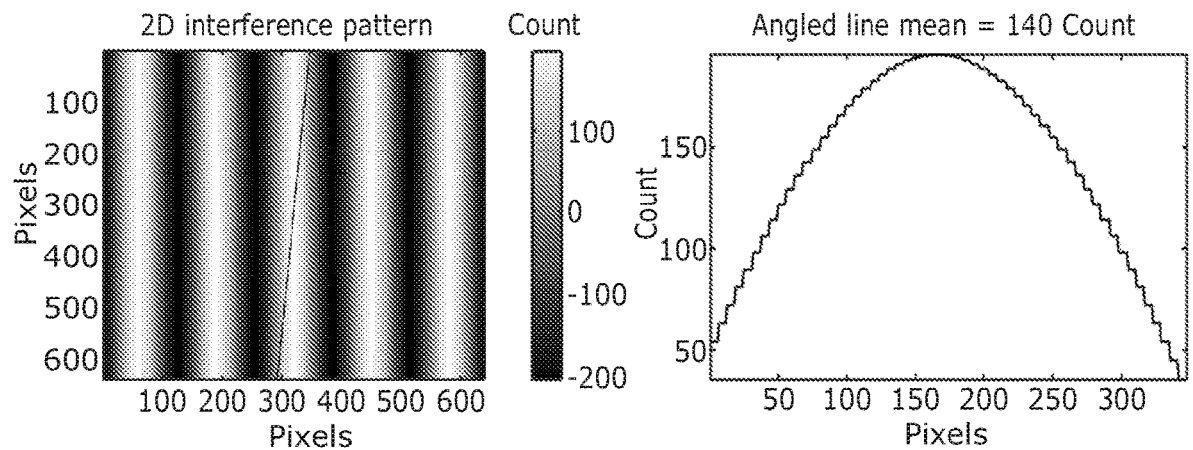
FIGS. 10 and 11 show similar plots to those of FIGS. 4 and 7 but for noise signals when averaging is performed at a 5° offsetangle.
Figure 11:
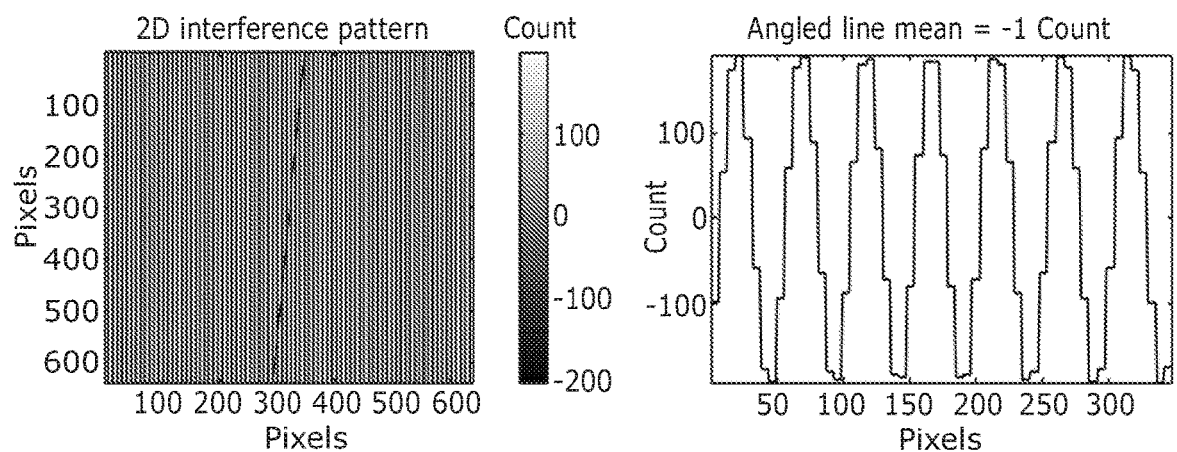

FIGS. 10 and 11 illustrate the reasons why the right hand side of the graph, that is the higher wavenumber, are suppressed even at lower angle of rotation as compared to the lower wavenumbers which require a higher angle of rotation to also be suppressed. In FIG. 10 the image on the left shows a relatively low frequency interference pattern with the fringes arranged in a column direction on the 2D detector array. In the figure the black line is at a small roll angle of 5° to the column direction. The signal at the pixels along the black line is used in this analysis. The plot on the right-hand side shows the signal value at each location along the 5° angled line. Notice that the black line largely spans one of the peaks of the column-wise pattern on the detector, and that is evidenced further by the plot on the right which rises from a low value to a peak and returns again to a low value.

If we remember that in general we are looking to obtain a one dimensional interferogram from a two dimensional image, then the signals from the pixels along the black line are used to acquire a single point in our one dimensional signal (interferogram) from a rotated detector. This may be achieved by simply taking its average value. In an analogous way, the average of the line can give us an indication of the contribution of the vertical column pattern to that averaged signal along an angle direction. The maximum peak height on the image on the left is approaching around 200 Counts. If an average is taken along the vertical axis at the location of one of the peaks we would expect to obtain an average signal also of around 200 Counts. However, in FIG. 10 the plot on the right-hand side has been acquired from a line at an angle of 5° to the vertical, which means this signal average is reduced a little by the angle of the line used. Thus the average for the black line is reduced to 140 from close to 200 for the vertical. Although the contribution from the column has been reduced a little it is not enough to noticeably remove the contribution. A larger roll angle would allow the black line to extend over more periods of the interferogram and thus allow its contribution to be supressed. This is considered in FIG. 11 which shows a higher spatial frequency case.

FIG. 11 again shows an interference pattern type plot on the left and signal counts along line on the right. However, in FIG. 11 the spatial frequency of the vertical pattern on the 2D detector is increased from that in FIG. 10. Similar to FIG. 10, in FIG. 11 there is a 5° angled black line on the left-handside but in FIG. 11 it extends across many peaks and troughs of the column sinusoidal pattern. The peaks and troughs are illustrated in the right hand plot. Hence, for the higher spatial frequency case of FIG. 11 the mean value of the line is reduced to close to zero. Note that the count values in the left hand figures of FIGS. 10 and 11 run from negative values to positive values, so the best that can be achieved from this averaging will be close to zero. This is for simulated results and is a result of constructive and destructive interference effects. In practice the counts would be positive, for example scaling from 0 to 400 instead of −200 to +200. The close to zero for the average of FIG. 11 compares to a worst case value of a vertical line which gives a value of 200. Hence, we see that at 5° higher spatial frequencies are more readily suppressed. This explains why the right-hand side of the noise plot of FIG. 9 is supressed at smaller roll angles than the right. Furthermore, when the rotation angle is 45° this provides as high suppression of noise across all spatial frequencies as can be achieved. On taking a Fourier transform of the spatial interferogram the spatial frequencies (equivalent to wavelengths or peaks per unit length) are converted to frequencies (equivalent to wavelengths or peaks per unit time).

Now that the reduction or suppression in noise has been explained, we consider methods for extracting a one dimensional signal from a two dimensional interference pattern.

There are a number of ways of acquiring a wavelength or frequency spectrum from the interference pattern recorded on a 2D detector. We present here three possible methods for doing so.

Method 1: The +/−45° "Special" Case

A first method to obtain a 1D interferogram signal from a detector is if the detector is rotated by +/−45°. In such a case software with bult in functions can be used to extract the signal from the diagonal or "diagonal columns" of the image. For example, programming languages (such as MATLABs built in "diag" function) and software can be implemented in the analyser which analyses the data received from the detector. These functions may include the use of matrix mathematics.

An example series of steps of a numerical algorithm (pseudo code) is:
Loop from first to last diagonal of matrix;
Extract the diagonal columns;
Calculate the average of each diagonal column; and
Use the average of each diagonal column as the final 1D signal value for each column.

Method 2: Average along arbitrary diagonals by binning pixels into 1D array

For this method, we first create a reference coordinate grid that can be used to extract the coordinates of arbitrary diagonal or skew columns. We will now describe the steps of this second method, which is more complex than the first method.

Step1: Create a reference matrix that will be used to identify pixel coordinates.

Figure 12:
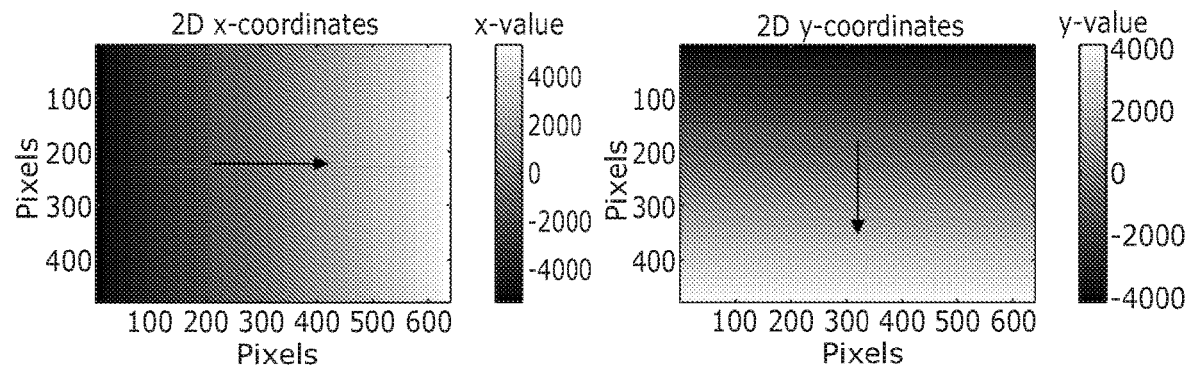
FIG. 12 shows a matrix having elements corresponding to a two dimensional detector array, with values of the elements increasing in the horizontal direction in the left hand plot and values of the elements increasing in the vertical direction in the right hand plot.

To create a reference matrix, first make 2 matrixes with the same size and number of pixels as the original 2D image from the detector. Next, fill one of these matrices with arbitrary monotonically increasing x values and the other with monotonically increasing y values, an example of these two matrices is shown in FIG. 12. The left hand image is of increasing x values and the right hand image is of increasing y values. The arrows show the direction of increase.

Using these two matrices a third matrix is created that has monotonically increasing values along the required diagonal or skew direction. If we call the matrix on the left in FIG. 12 X and the one on the right Y, and the new third matrix is called R with values increasing at a skew angle θ, then R is then given by:

$$R = Y \sin\theta + X \cos\theta$$

Figure 13:
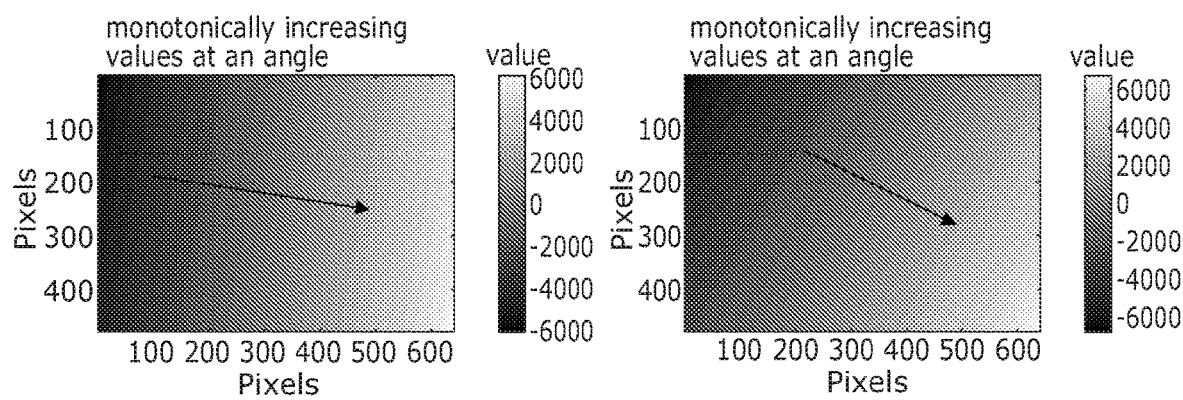
FIG. 13 shows similar plots to FIG. 12 with the values of elements increasing in a direction of 10° in the left hand figure and increasing in a direction of 30° in the right hand figure.

FIG. 13 shows two example reference matrices calculated using the above formula. The left hand image is at an angle of 10° rotation and the right hand image is at 30° rotation.

Step 2: Extract the coordinates from the angled reference matrix

Start by creating an array (A) of monotonically increasing values that extend from the minimum value in the reference matrix to the maximum value in the reference matrix. The number of elements in this array will be equal to the number of elements in the extracted interferogram and can be decided somewhat arbitrarily. The separation $A_S$ between neighbouring values in A is constant and is equal to the difference in values between neighbouring elements in the array.

Next create a for loop over the values in the array A. This can be done by denoting k as the array element number. For each value of k in array A find the indices (coordinates of pixels i,j) of the values in the matrix R that satisfy the condition:

$$|R(i,j) - A(k)| < A_S/2$$

Figure 14:
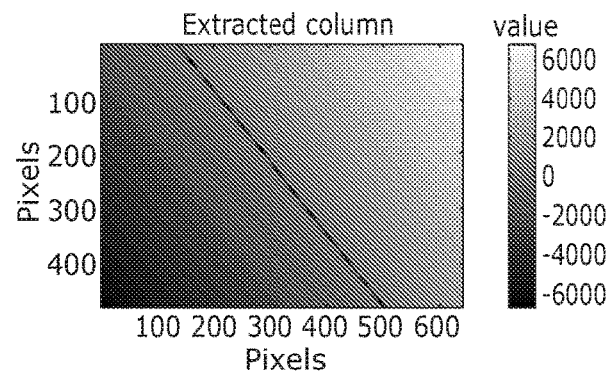
FIG. 14 shows the same plot as the right hand side of FIG. 13 with a line providing an example of pixel data to be used in averaging to achieve 1D data output.

In FIG. 14 the black line on the image shows the pixels that satisfy the above condition when A(k)=0.

Figure 15:
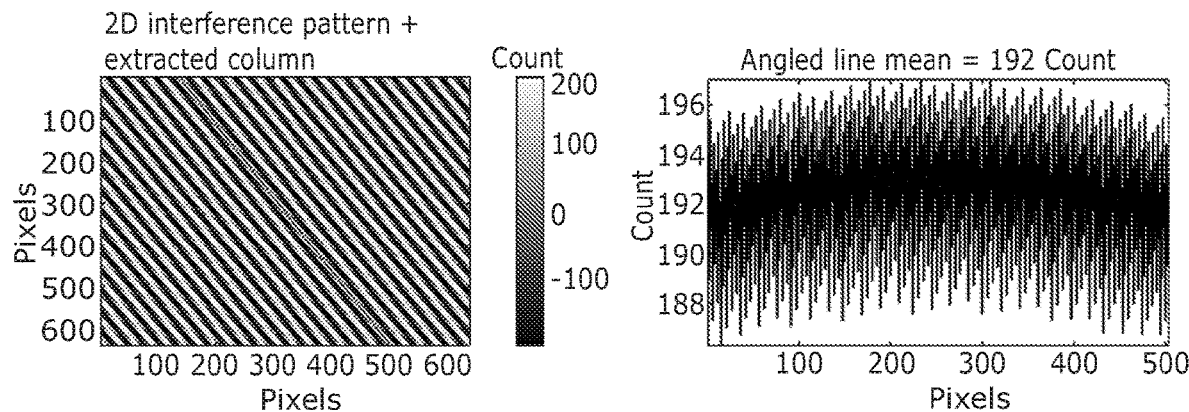
FIG. 15 shows in the left hand plot the result of a simulated interference pattern with a line providing an example of pixel data to be used in averaging to achieve 1D data output, and the data at pixels along the line is shown in the right hand figure.

Step 3: Use extracted coordinates to average the angled columns and obtain an interferogram The plots in FIG. 15 show how the pixel coordinates of the black line of FIG. 14 are used to extract the required skew or diagonal column from the 2D interference pattern. The black line on the image on the left in FIG. 15 shows the pixels that are extracted from the image. The line covers the same pixel coordinates as in the image in FIG. 14. The plot on the right in FIG. 15 shows the value of each pixel in the extracted line along with the mean value of the extracted line in the title of the plot. Here the mean value is given as 192. The slight bending in the plot on the right-hand side may be due to the method used to model a 2D interference pattern, which is by using the interference from two point sources.

Figure 16:
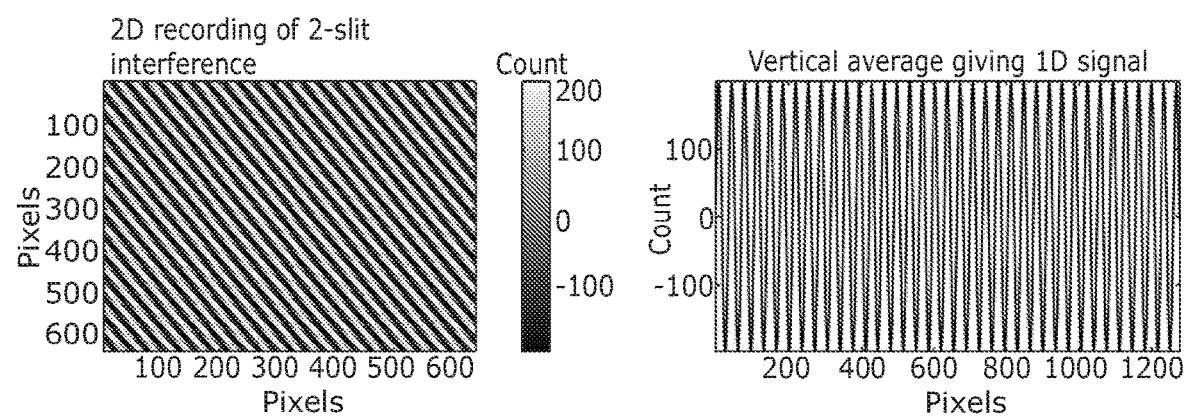
FIG. 16 shows in the left hand plot the result of a simulated interference pattern with a line providing an example of pixel data to be used in averaging to achieve 1D data output, and the averaged data across the interference pattern is shown in the right hand figure.

The mean value of the extracted line is then used as a single value in the 1D signal. To extract the full 1D interferogram we repeat over the different values of k whilst recording the mean value of the extracted angled/diagonal column into a 1D array. For the 2D interference pattern shown on the left of FIG. 16, the resulting 1D interferogram is given in the plot on the right.

Method 3: 2D Fourier Transform

Figure 17:
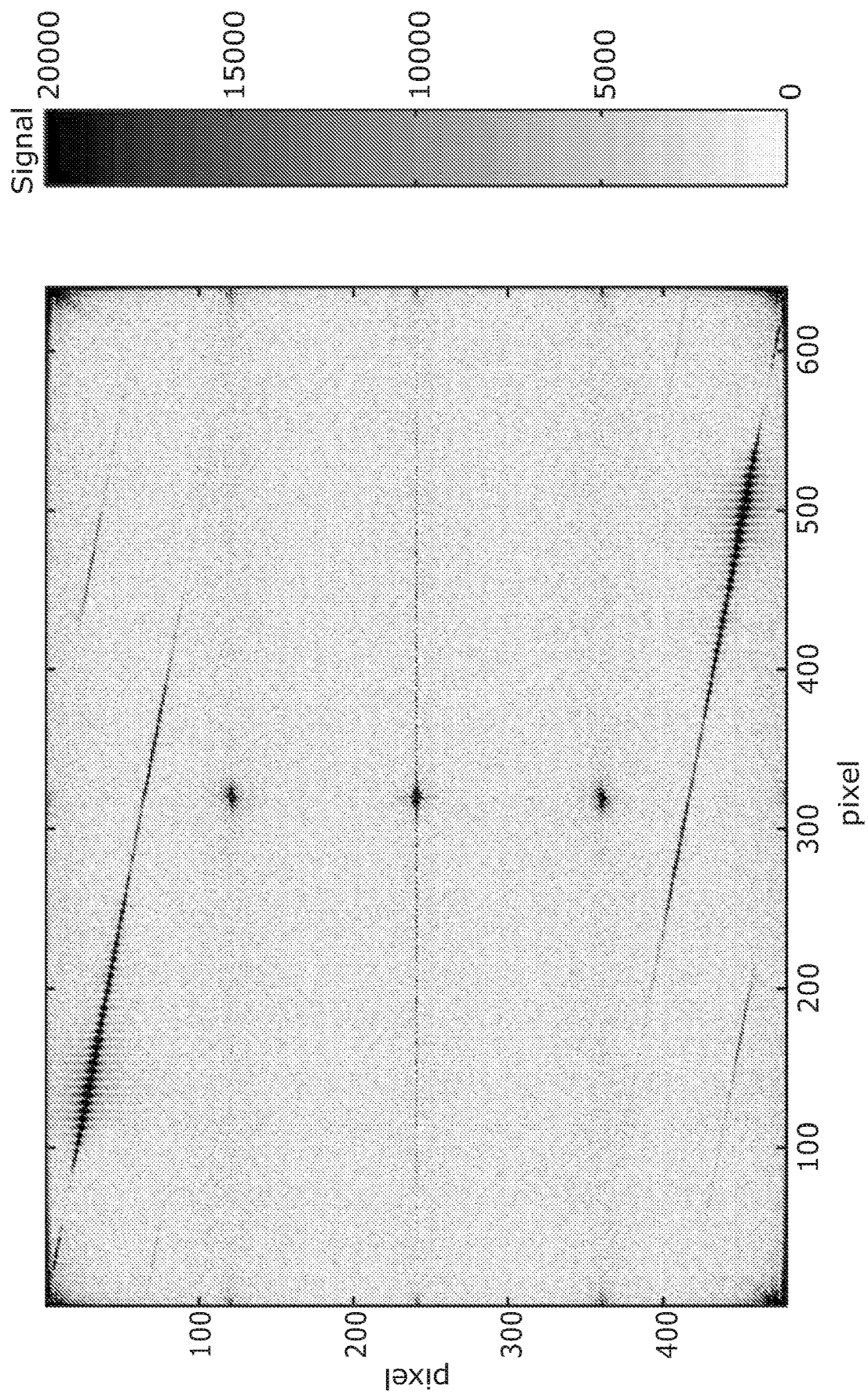
FIG. 17 shows a two-dimensional inverse Fourier transform of a detector image with an interference pattern oriented at 15° to the column direction of the detector.

FIG. 17 shows a two-dimensional inverse Fourier transform of a detector image with an interference pattern oriented at 15 degrees. The signal present in the interference pattern is clearly seen as a diagonal or skew band or streak line in the lower part of the transform. Around the signal, but clearly separated from it, are features that are vertical and horizontal in orientation. These are the detector-related distortions and noise discussed above and resulting from the row and column noise. A reasonable choice of detector angle allows one to avoid these distortions. Without an angle, the signal would overlap some of the detector effects.

The described invention of measuring an interference pattern on an angle thus produces a significant advantage over existing techniques because of the separation of detector-related distortions and noise effects to improve the signal measurement.

We now describe a method to extract the signal spectrum from the 2D Fourier transform (shown in FIG. 17). This represents the preferred method we have currently developed for use with the rotated detector image. Various alternate analysis methods, however, will remain readily apparent to those skilled in the art. Any and all such modifications, equivalents and alternatives are intended to fall within the spirit and scope of the present invention.

The steps are as follows:
1) Adjust the spectrometer such that the light or radiation interference pattern falls across the detector at a skew angle;
2) Record an image;
3) The image is apodized, that is multiplied by a smooth function that decays to zero at the edges of the image. This is a standard spectroscopy technique to limit edge effects in the Fourier transform;
4) A standard 2D Fourier transform is taken of the apodized image. The transform is in complex numbers, and we take the real magnitude component. This is what is seen in FIG. 17;
5) The signal line is identified. This may by taking maximum values along a line or extracting the coordinates of the line using the maximum signal within the region of interest; and
6) The signal strength at each point along this line is extracted. This is achieved by taking the maximum-strength point in a column, and doing a three-point parabolic fit to that point and its two neighbours along that column. This fitting provides a more accurate measure of the peak strength.

Results

Figure 1:
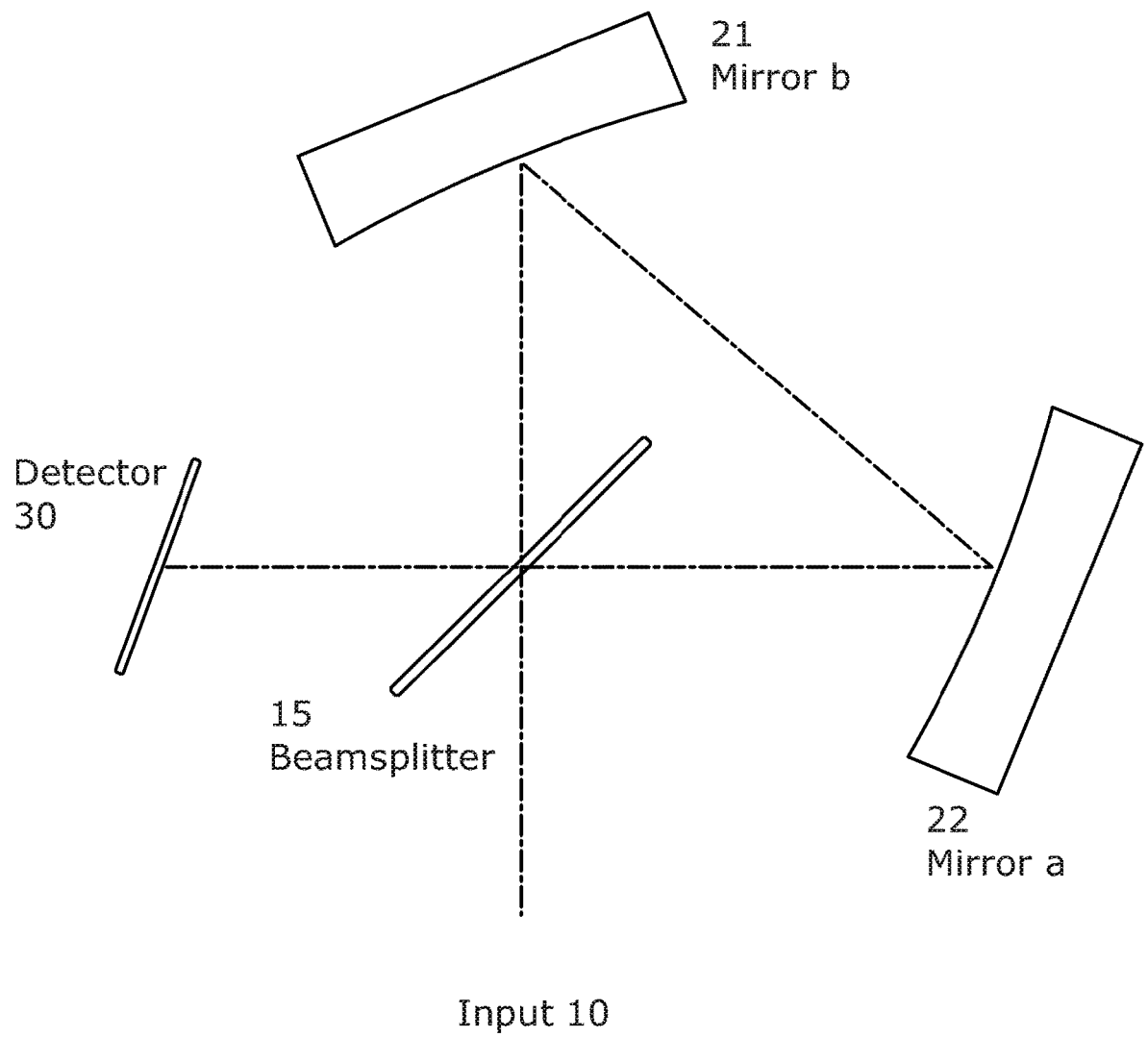
FIG. 1 is a schematic diagram of modified Sagnac interferometer according to the prior art.
Figure 2:
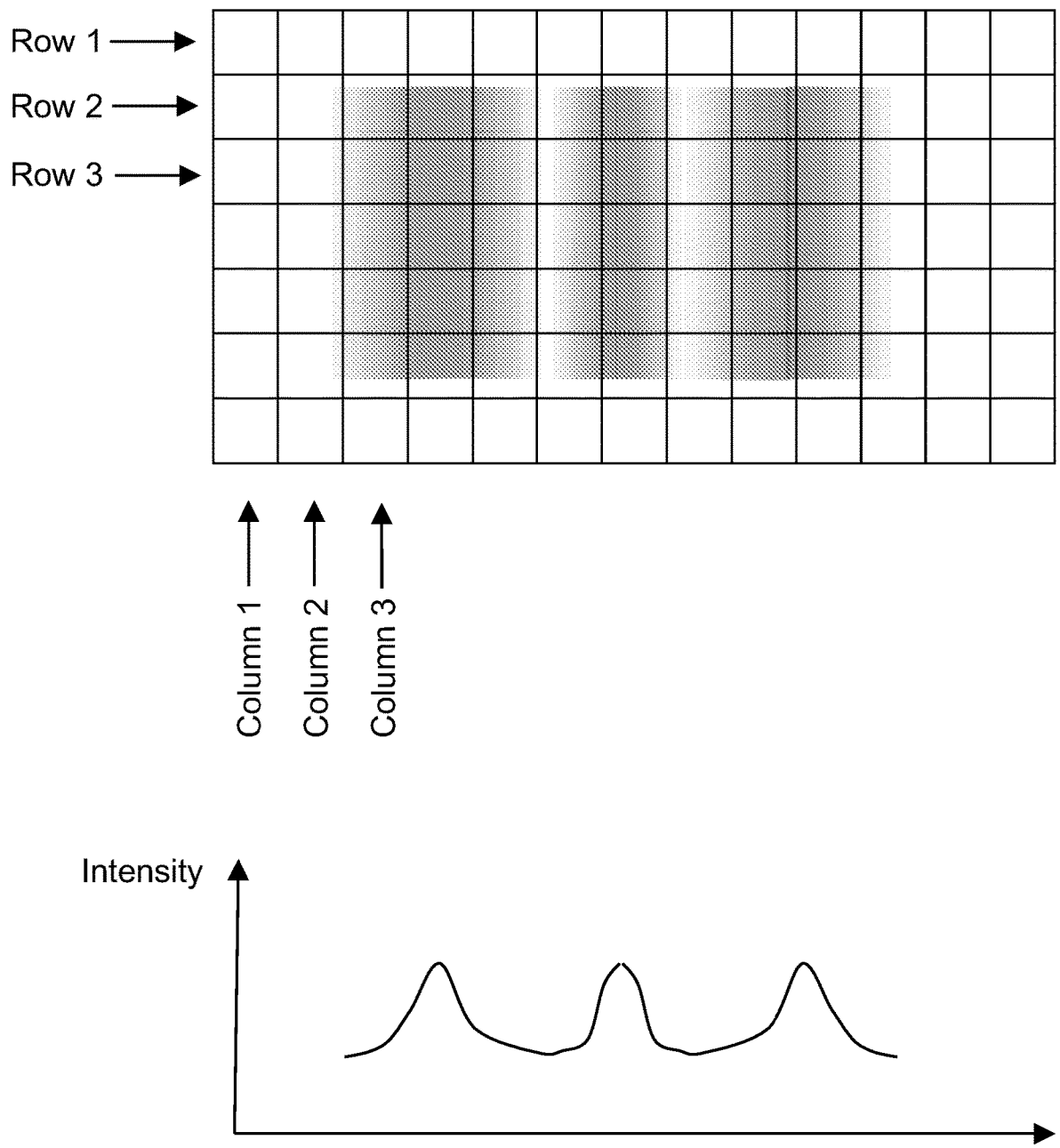
FIG. 2 is a schematic diagram of fringes of an interference pattern on a detector having a two-dimensional array of pixels and a corresponding schematic intensity plot.
Figure 18:
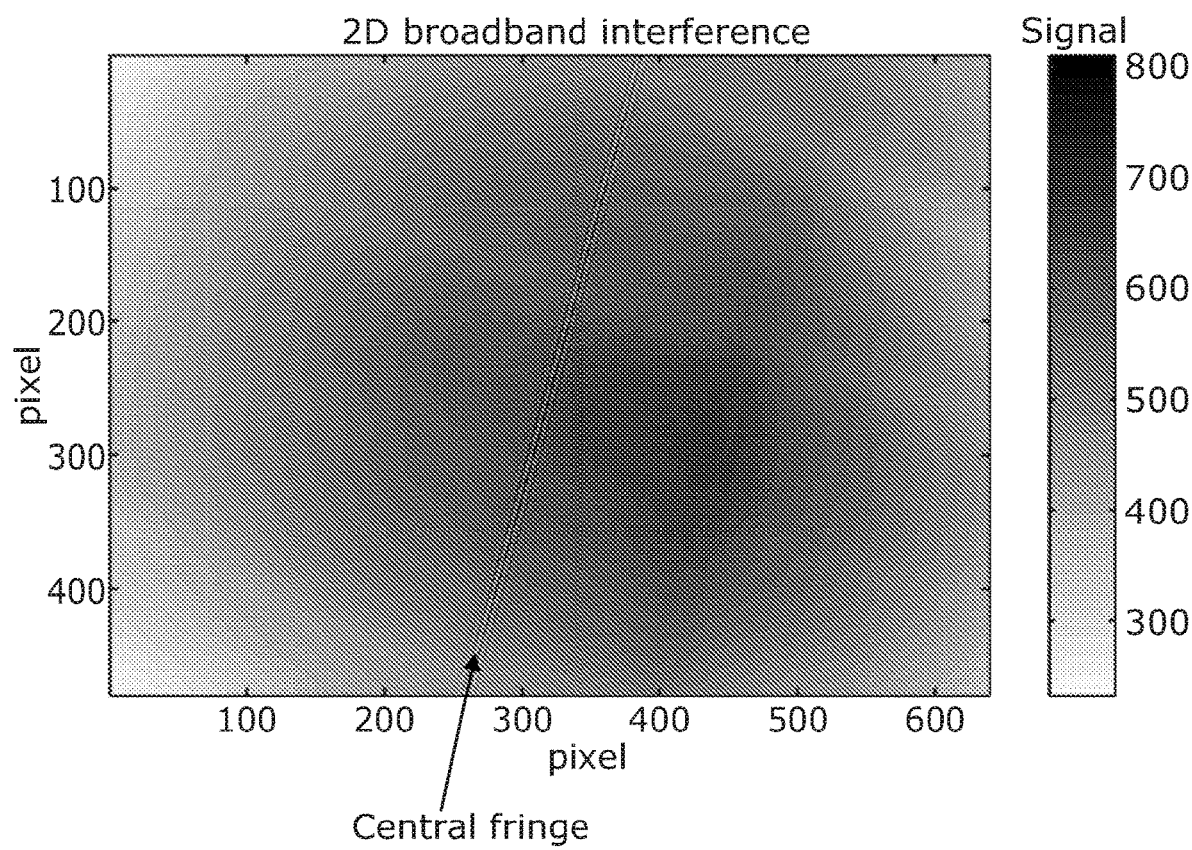
FIG. 18 shows an interference pattern resulting from the interferometer of FIG. 1 recorded on a detector array rotated by 15°.

FIG. 18 shows an example result obtained using the interferometer of FIG. 1. The detector has been rotated to a skew angle of 15°. The input light is a broadband source which results in a narrow group of fringes, such as including 3 or 4 clear maxima. These can be seen in the centre of the plot of FIG. 18. The surrounding parts of the plot also include signal because of the broadband nature of the source but the fringes are localised to the centre. In an alternative arrangement using a narrowband source the fringes would show more maxima and minima and repeat many times across the detector. For a monochromatic source the fringes would be of equal amplitude all across the plot. The examples in previous figures are a simplification to a narrowband or monochromatic source. For a monochromatic source, when a spatial-to-frequency transform is taken a single peak in a plot of frequency vs intensity would be seen.

The result of FIG. 18 is based on the broadband source being passed through a sample, and the sample absorbing light or radiation at limited frequency ranges or lines. Hence, when the data from FIG. 18 is extracted using one of the offset-angle techniques described above, and a spatial-to-frequency transform is taken, the output spectrum will show absorption bands at certain frequencies.

Diffraction Grating Based Device

We have described above how the present invention is applicable to interferometer-based spectrometers. The techniques described herein are also applicable to diffraction grating based spectrometers (and indeed any other devices where a two-dimensional image recorded on detector array is reduced to a one-dimensional data set).

For a diffraction grating based device the arrangement of apparatus would be similar to that shown in FIG. 6, but the interferometer 220 would be replaced by the diffraction grating. The interference pattern 235 would be replaced by one or more output orders, each order dispersing different wavelengths to different spatial positions across the detector array.

Figure 19:
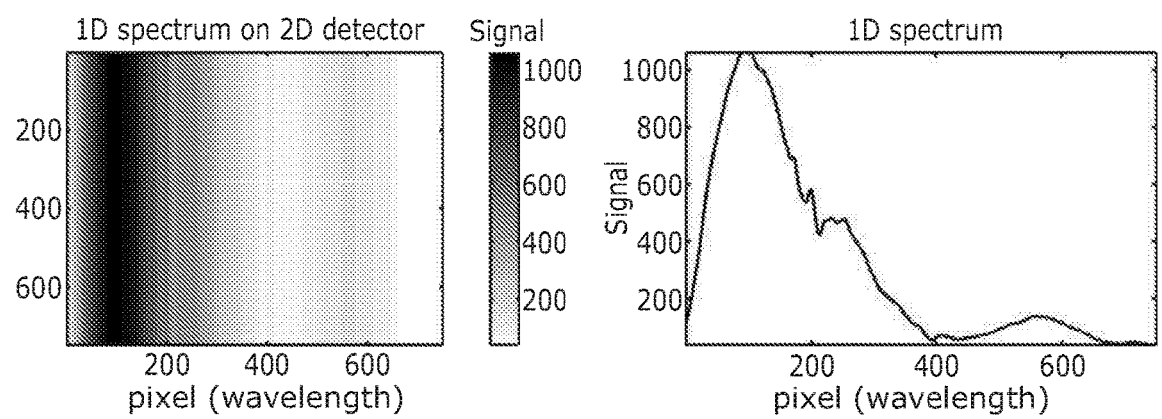
FIG. 19 shows a spectrum from a diffraction grating recorded on a detector array, without a skew offset to the detector.

The left hand plot of FIG. 19 shows at least part of a single diffraction order spread across the two-dimensional detector array. Since the position or pixel number along the detector scales with wavelength, the data actually collected corresponds to the spectrum of frequencies in the input light. As can be seen in the left hand figure of FIG. 19 the different intensities at different positions across the detector are seen as fringes. The plot on the right hand side of FIG. 19 is produced by averaging along the vertical columns of the detector array.

In similar manner to the techniques described above regarding the interferometer-based device, the signals of the detector array for a diffraction-based device will also be subject to row and column noise. The noise can be reduced by rotating the detector array to a skew angle to the fringe direction in the same way as described above. The data is then averaged along a corresponding diagonal or offset angle to provide the output spectrum. For diffraction grating based devices there is no need to take a transform because the collected data is already in the wavelength domain.

The person skilled in the art will appreciate that various further modifications and alterations may be made to the above described apparatus and methods without departing from the scope of the appended claims. For example, different interferometer, detectors and analysis methods may be used.

The invention claimed is:

1. A Fourier transform spectrometer for detecting one or more wavelength components of sample radiation, the spectrometer comprising:
   a detector comprising a two-dimensional rectilinear array of pixels for generating signals representing an image based on collected sample radiation, the rectilinear array having the pixels arranged in rows and columns;
   one or more optical components arranged to form a spatial pattern based on spectral features of the sample radiation, wherein the spatial pattern is an interferogram, the spatial pattern comprising a plurality of aligned substantially parallel fringes oriented at a non-zero skew angle to the two-dimensional rectilinear array; and
   an analyser arranged to receive the signals and configured to:
      perform a spatial-to-frequency domain transform of signals representing the image, and sample in the frequency domain along a streak line at a non-zero angle corresponding to the non-zero skew angle of the detector to determine the one or more wavelengths; or
      integrate or average signals along one or more lines parallel to the direction of the aligned fringes, and perform a spatial-to-frequency domain transform to determine the one or more wavelengths; and
      provide an output related to the one or more wavelengths.

2. The spectrometer of claim 1, wherein the non-zero angle is between 0.5 and 45°.

3. The spectrometer of claim 2, wherein the non-zero angle is between 5 and 45°.

4. The spectrometer of claim 1, wherein the one or more optical components are configured to form a static interferometer.

5. The spectrometer of claim 4, wherein the static interferometer is a common path interferometer such as a Sagnac interferometer.

6. The spectrometer of claim 1, wherein the detector is adapted to detect radiation in the near infra-red range of 700 nm to 2.5 µm, in the mid infra-red range of 2.5-20 µm or radiation in the visible range.

7. The spectrometer of claim 1, wherein the sample radiation is electro-magnetic radiation that has illuminated a physical sample or is generated from a sample emitter.

8. The spectrometer of claim 7, wherein the detector is a CCD or CMOS array.

9. The spectrometer of claim 7, wherein the detector is a microbolometer array.

10. The spectrometer of claim 1, wherein the detector is an analogue detector.

11. The spectrometer of claim 1, wherein the detector is planar and is arranged at the plane of the spatial pattern.

12. The spectrometer of claim 1, wherein the analyser is configured to perform the following steps:
receive data representing readout from the pixels of the array;
extract the data from the pixels along diagonals of the array;
calculate an average of the data for each of the diagonals; and
generate a one dimensional array from the averages, the one dimensional array representing the spectral information as a spectrum or as an interferogram.

13. The spectrometer of claim 12, wherein the detector is at a non-zero angle of 45°.

14. The spectrometer of claim 1, wherein the analyser is configured to perform the following steps:
generate a reference matrix having increasing values across the elements of reference matrix at the non-zero skew angle;
receive data representing readout from the pixels of the detector array;
from the readout data extract data from pixels along lines at increasing values of the elements of the reference matrix;
calculate an average of the data for each of the lines; and
generate a one dimensional array from the averages, the one dimensional array representing the spectral information as a spectrum or as an interferogram.

15. The spectrometer of claim 14, wherein the spectrum or interforgram comprises an equal number of elements as the reference matrix.

16. The spectrometer of claim 14, wherein the reference matrix is generated from first and second matrices, the first matrix X having increasing values in the row direction and the second matrix Y having increasing values in the column direction.

17. The spectrometer of claim 16, wherein the reference matrix R having increasing values at a non-zero angle θ is generated from the first X and second Y matrices by the equation $R = Y \sin\theta + X \cos\theta.$ 18. The spectrometer of claim 1, comprising identifying a streak line in the transformed image, wherein the step of identifying comprises determining the maximum data value in a column of the transformed image data.

19. The spectrometer of claim 1, wherein after receiving the image data the image data is apodized.

20. The spectrometer of claim 1, wherein the one or more optical components are configured to form a common path interferometer, the common path interferometer is arranged to divide an input beam of the sample radiation into first and second beam portions directed in opposite directions around a cyclic path to form an interference pattern between the first and second portions at the detector surface,
the cyclic path being defined by at least two mirror regions curved in the plane of the cyclic path, such that the interference pattern represents path difference variations between the first and second beam portions across the detector surface in the plane of the cyclic path.

21. The spectrometer of claim 1, wherein the one or more optical components and the detector are arranged such that the plurality of aligned substantially parallel fringes are formed oriented at a non-zero skew angle to the two-dimensional rectilinear array, the non-zero skew angle comprising an in-plane rotation of the detector.

22. A method of detecting one or more wavelength components of sample radiation, the method comprising:
generating, using a Fourier transform spectrometer, a spatial pattern based on spectral features of the sample radiation, the spatial pattern being an interferogram and comprising a plurality of substantially parallel fringes;
detecting, on a detector comprising a two-dimensional rectilinear array of pixels, in which the pixels are arranged in rows and columns, an image of the spatial pattern, the plurality of parallel fringes aligned at a non-zero skew angle to the two-dimensional rectilinear array, and outputting signals representing the image; and
receiving the signals at an analyser and the analyser performing steps of:
performing a spatial-to-frequency domain transform of signals representing the image, and sampling in the frequency domain along a streak line at a non-zero angle corresponding to the non-zero skew angle of the detector to determine the one or more wavelengths; or
integrating or averaging signals along one or more lines parallel to the direction of the aligned fringes, and performing a spatial-to-frequency domain transform to determine the one or more wavelengths; and
providing an output related to the one or more wavelengths.

23. The method of claim 22, wherein the non-zero angle is between 0.5 and 45°.

24. The method of claim 23, wherein the non-zero angle is between 5 and 45°.

25. The method of claim 22, wherein spatial pattern is generated using one or more optical components configured to form a static interferometer.

26. The method of claim 25, wherein the static interferometer is a common path interferometer such as a Sagnac interferometer.

27. The method of claim 22, wherein the detector detects radiation in the near infra-red range of 700 nm to 2.5 µm, in the mid infra-red range of 2.5-20 µm or detects visible light.

28. The method of claim 22, wherein the sample radiation is electro-magnetic radiation that has illuminated a physical sample or is generated from a sample emitter.

29. The method of claim 22, wherein the detector is an analogue detector, such as a CCD array, a CMOS array, or a microbolometer array.

30. The method of claim 22, wherein the spatial pattern comprising a plurality of aligned substantially parallel fringes are generated on the two dimensional array such that they are oriented at a non-zero skew angle to the two-dimensional rectilinear array, the non-zero skew angle comprising an in-plane rotation of the detector.

31. A spectrometer for detecting one or more wavelength components of sample radiation, the spectrometer comprising:
- a detector comprising a two-dimensional rectilinear array of pixels for generating signals representing an image based on collected sample radiation;
- one or more optical components arranged to form a spatial pattern based on spectral features of the sample radiation, the spatial pattern comprising a plurality of aligned substantially parallel fringes oriented at a non-zero skew angle to the two-dimensional rectilinear array; and
- an analyser arranged to receive the signals and provide an output related to the one or more wavelengths;
- wherein the analyser is configured to perform the following steps:
  - generate a reference matrix having increasing values across the elements of reference matrix at the non-zero skew angle;
  - receive data representing readout from the pixels of the detector array;
  - from the readout data extract data from pixels along lines at increasing values of the elements of the reference matrix;
  - calculate an average of the data for each of the lines; and
  - generate a one dimensional array from the averages, the one dimensional array representing the spectral information as a spectrum or as an interferogram.

32. The spectrometer of claim 31, wherein the spectrum or interforgram comprises an equal number of elements as the reference matrix.

33. The spectrometer of claim 31, wherein the reference matrix is generated from first and second matrices, the first matrix X having increasing values in the row direction and the second matrix Y having increasing values in the column direction.

34. The spectrometer of claim 33, wherein the reference matrix R having increasing values at a non-zero angle $\theta$ is generated from the first X and second Y matrices by the equation $$R = Y \sin \theta + X \cos \theta.$$

* * * * *